Oct. 7, 1969
W. J. CRAIG
3,470,927
STORAGE CONTAINER
Filed Aug. 22, 1967
2 Sheets-Sheet 1
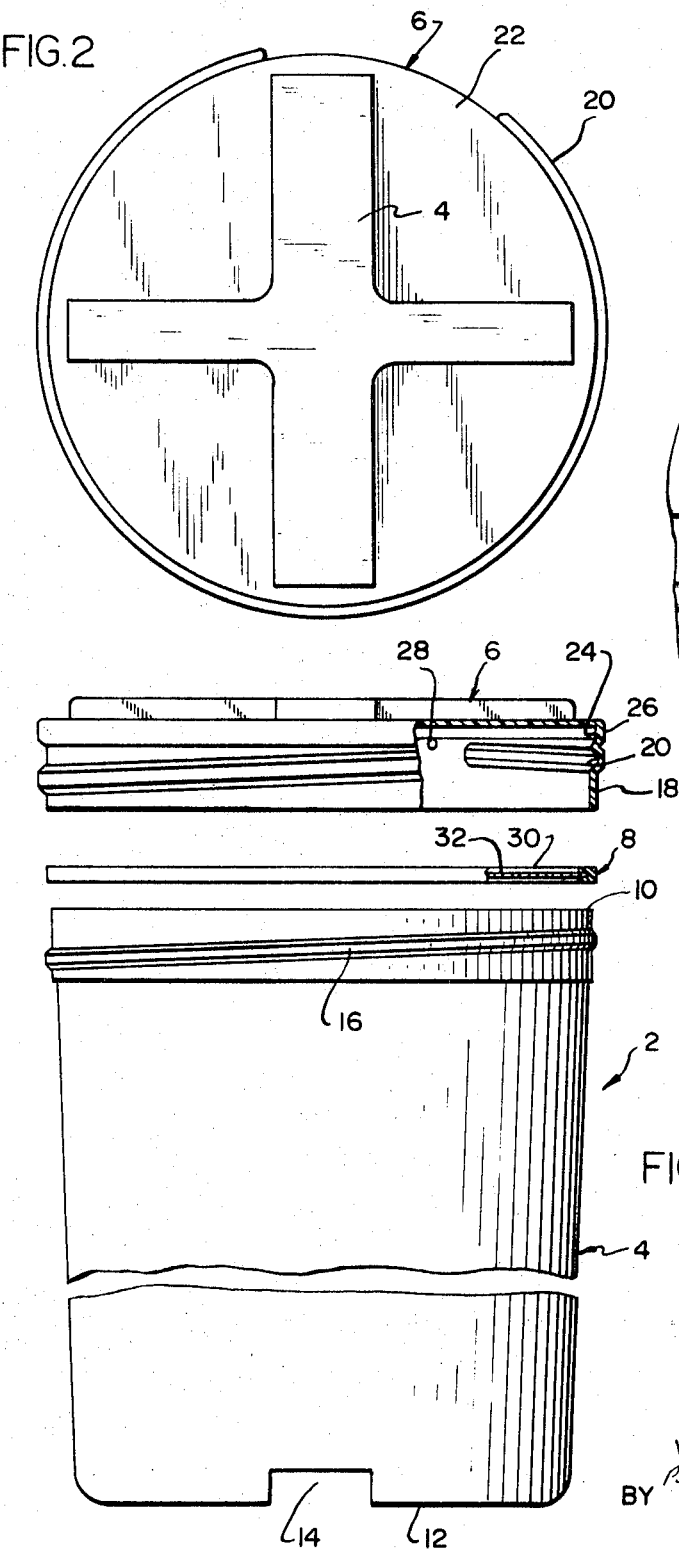
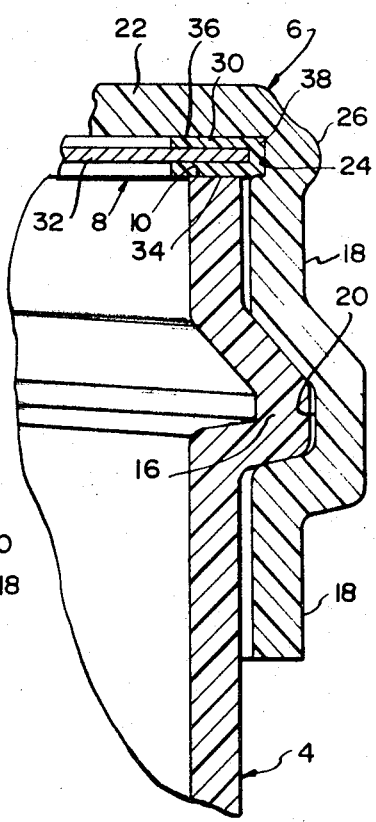
INVENTOR.
WALTER J. CRAIG
BY Petherbridge, ...
      Aubel
ATTORNEYS.

Oct. 7, 1969 W. J. CRAIG 3,470,927
STORAGE CONTAINER
Filed Aug. 22, 1967 2 Sheets-Sheet 2
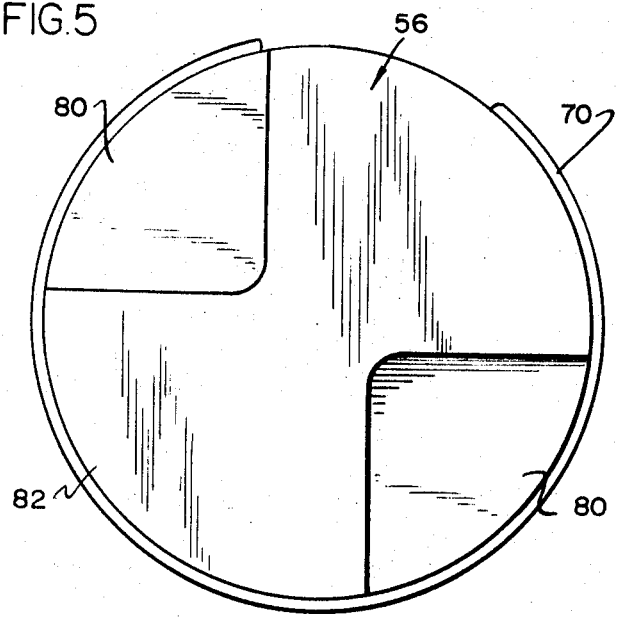
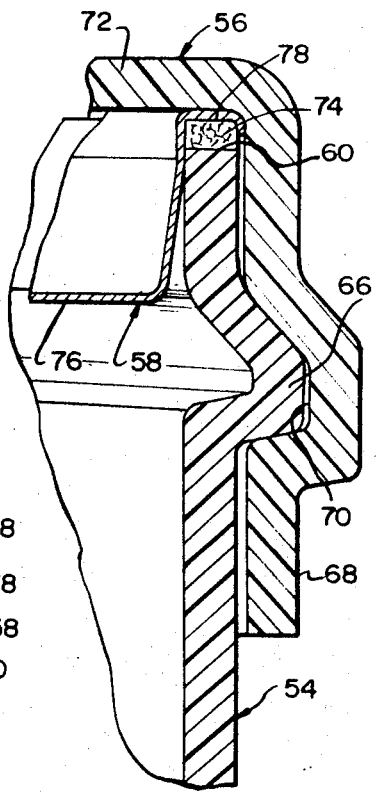
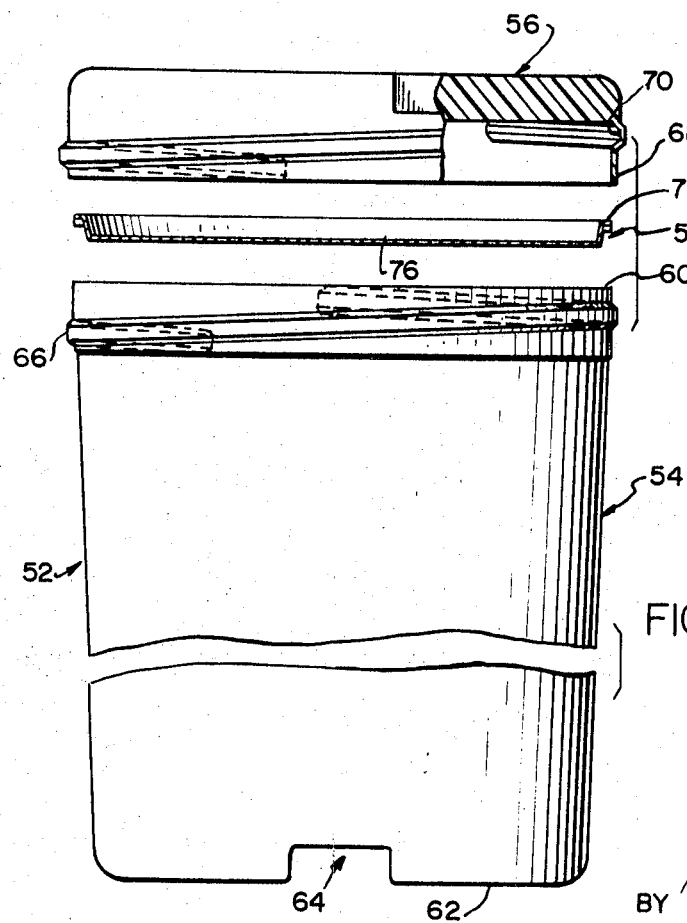
INVENTOR.
WALTER J. CRAIG
BY Petherbridge, O'Neill &
Aubel
ATTORNEYS.

United States Patent Office 3,470,927
Patented Oct. 7, 1969

3,470,927
STORAGE CONTAINER
Walter J. Craig, Prospect Heights, Ill., assignor to K and M Rubber Company, Elk Grove Village, Ill., a corporation of Illinois
Filed Aug. 22, 1967, Ser. No. 662,382
Int. Cl. B65d 25/00, 41/16
U.S. Cl. 150—.5                          8 Claims

ABSTRACT OF THE DISCLOSURE

A storage container preferably fabricated under a blow-mold process. The flexible plastic storage container is designed to hold substantial quantities of liquid, granular or powdered materials in a manner such that they can be transported without loss due to leakage from the flexible container. The base or lower portion of the container is designed to be closed by a relatively rigid cover portion and a rigid gasket positioned between the cover and the base. The cover and the gasket are constructed to impart maximum rigidity to the container when it has been filled and closed. This serves to prevent deflection of the relatively thin and flexible container walls and a resultant partial or complete loss of its contents.

---

While plastic storage containers of many types have been used in a large variety of applications, none have been developed which are capable of utilizing relatively thin guage plastic materials and can hold substantial quantities of liquid, granular or powdered material. The containers of the invention are fabricated from relatively thin-guage flexible plastic materials and ordinarily are provided with a wide mouth base portion, a cover or closure portion, and a gasket assembly interposed between these portions.

The subject containers are generally cylindrical in configuration, but in preferred embodiments, the containers are tapered slightly from the bottom to the top thereof to facilitate unloading. The containers can thereby be readily unloaded merely by tipping, and it is not necessary to provide exterior hand-grips to enable the person to lift the container for unloading.

One of the problems attendant in the use of flexible wide-mouth containers lies in frequent difficulty of achieving proper closure of the container to prevent material loss and to impart structural rigidity to the top portion of the container when a closure member is applied thereto for storage or shipment of the container and its contents in commerce.

The container of the invention utilizes a plastic top which is ordinarily fabricated from the same material as the base portion thereof and, in fact, is preferably produced in a blow-molding process simultaneously with the base portion thereof. The top portion of the container base is preferably provided with molded threads and the top portion of the container with complementing threads to permit the cover to be screwed on to the base portion.

To establish an effective seal of the container to permit material loss therefrom, a generally circular gasket assembly is employed between the top portion of the container base and the closure or cover thereof. The gasket assembly is formed with a resilient portion which is designed to rest upon the peripheral portion of the base bordering the opening thereof and to be compressed thereupon when the cover is applied to and secured to the base. A second portion of the gasket assembly comprises a rigid generally transverse member which spans the breadth of the container opening and imparts rigidity to the resilient portion of the gasket as well as to the upper and most flexible end of the container base portion when the closure or cover member has been secured in place.

When the desired contents have been placed in the container and the container has been closed and secured with the cover and gasket assembly, the unit is in condition for shipment or storage.

Various objects and advantages of the invention will hereinafter become more fully apparent from the following description of the drawings illustrating presently preferred embodiments hereof and wherein:

FIG. 1 is a side elevation of the container assembly of the invention with parts thereof broken away;

FIG. 2 is a top plan view of the container illustrated in FIG. 1;

FIG. 3 is an enlarged partial sectional view of the top portion of the container illustrating the elements thereof in closed relationship;

FIG. 4 is a side elevation of a modified embodiment of the container of the invention with parts thereof broken away;

FIG. 5 is a top plan view of the container illustrated in FIG. 4; and

FIG. 6 is an enlarged partial sectional view of the container illustrated in FIG. 4 showing the elements thereof in closed relationship.

Referring particularly to FIG. 1, it can be seen that the container, which is generally designated 2, consists of three primary elements, namely, a base member 4, a closure or cover member 6 and a gasket assembly 8.

The base member 4 of the container, which is preferably formed from a thin-gauge flexible plastic material in a conventional blow-molding process, has a generally cylindrical appearance in side elevation but is slightly inwardly tapered from the top edge 10 bordering the opening thereof to the bottom edge 12 of the base. While this slight taper does, to some extent, facilitate nesting of a plurality of containers, the taper serves primarily to facilitate the rapid unloading of the container while doing away with projecting or indented hand-grips which would otherwise be required to enable an individual to lift and empty the container. As is shown in FIG. 1, the bottom edge 12 of the base member of the container is formed with an integral, mold-in generally retangular channel 14 which extends entirely across the bottom of the container and opens at opposite sides thereof. This channel is designed to permit the placement of the container upon a surface having a complementing projection. A container can then be placed upon the projecting surface with the walls defining channel 14 straddling the projection. The container may now be loaded and the cover portion applied thereto in a rotating manner without producing corresponding movement in base member 4 since this element of the container is effectively restrained from movement by the channel 14 straddling a projecting surface of a platform upon which the container rests. This bottom channel 14 also facilitates unloading of the container. When the container is tipped to begin pouring therefrom, an individual may reach down and grip the walls bordering the channel 14 to control the rate of discharge therefrom.

Again referring to FIG. 1, it can be seen that the top portion of base member 4 is formed with a molded-in projecting thread 16 which begins at a point closely adjacent to the top edge 10 of the base and is gradually inclined downwardly therefrom. The top edge 10 of the base member 4, as can best be seen in FIG. 3, is generally flat in a horizontal and defines an annulus which borders the broad opening across the diameter of the base member 4.

The cover or closure member 6 of the invention, as is shown in FIGS. 1 and 3, is formed with a generally cylindrical body portion 18 which includes a thread portion 20 which extends from a point near the top of the cover 6 downwardly towards the open bottom thereof and of a configuration complementing that of thread 16 formed on base member 4. Again referring to FIGS. 1 and 3, it can be seen that the cylindrical body portion 18 of the cover 6 is joined to an integrally formed end closure 22. Considering the internal configuration of cover 6 shown in FIGS. 1 and 3, it can be seen that a channel 24 is shown to extend around the interior circumference of the cover between the cylindrical body 18 and the end closure 22 thereof. Due to the use of relatively thin guage flexible plastic materials and the utilization of blow-molding techniques to form the basic elements of the container of the invention, the outer circumferences of the cover 6 opposite channel 24 exhibits a circumferentially extending protuberance 26. As can be best seen in FIG. 3, the channel 24 formed in cover 6, has a generally rectangular configuration.

Referring particularly to FIG. 1, a circular projection 28 is formed in the cylindrical body 18 of the cover 6 below but closely adjacent to channel 24. Projection 28 extends inwardly into the interior of the cover a short distance. While only a single projection 28 is shown in the drawings, two or more projections are preferably provided in the cover in spaced relationship and adjacent the channel 24. These projections 28 are designed to cooperate with the channel 24 formed in cover 6 to secure gasket assembly 8 within cover 6 and to prevent it from becoming accidentally detached therefrom during ordinary use.

The gasket assembly 8 of the invention consists of a resilient annular U-shaped member, best seen in FIG. 3, which is preferably formed from rubber, although other durable resiliently compressible materials may be employed. A generally flat disk 32, fabricated from a rigid material such as wood, fiberboard, metal, reinforced plastic, etc., is positioned within the annulus formed by the U-shaped member 30 and extends between the horizontal legs 34 and 36 of the U-shaped member and generally abuts the base portion 38 thereof.

The gasket assembly thereby produces a circular rigid disk which is bordered at both the top and bottom edges by a resiliently compressible gasket. Ofter the cover 6 has been produced, the gasket assembly 8 is inserted into the open end of cover 6, forced over projections 28 and into channel 24 wherein it is removably retained by projections 28.

Following the installation of the gasket assembly in the cover 6, the cover may be threaded to base member 4 of the container until the U-shaped gasket member 30 has been resiliently compressed between the end closure 22 of the cover and the top edge 10 of the base member 4. When the container is filled or partially filled, it is preferred that the base member 4 is mounted upon some type of projection, such as a board secured to a platform, which engages the walls of channel 14 to prevent any appreciable movement of the container while the cover is being applied. Following closure of the container, the gasket assembly 6 in cooperation with the base member 4 and cover 6 will produce a rigid substantially leak-proof seal of an otherwise flexible thin-guage container which would be difficult to maintain in sealed condition.

Referring particularly to FIG. 2, the cover 6 of the container is shown to be provided with a raised generally cross-shaped portion 40 which projects from end closure 22 of the cover and is preferably molded integrally therewith during the blow-molding process. This cross-shaped raised portion 40 serves to provide a cover gripping means to facilitate the closure of the cover with respect to the base 4 and also to impart an added degree of rigidity and stiffness to the cover.

The modified embodiment of the container of the invention illustrated in FIGS. 4, 5 and 6, generally designated 52, is similar in many material respects to container 2 discussed above. The modified container 52 consists of the same primary elements, namely, a base member 54, a closure or cover member 56 and a gasket assembly 58.

Thin-guage flexible plastic materials are used preferably in a blow-molding process to form this container. The base member 54 has a generally cylindrical appearance but upon close inspection can be seen to be inwardly tapered from the top edge 60 bordering the opening thereof to the bottom edge 62 of the base 54. The taper in this instance provides the same advantages and results as those obtained with the previous embodiment.

As is illustrated in FIG. 4, the bottom edge 62 of the container base 54 is formed with an integral, molded-in rectangular channel 64 which extends across the bottom of the container 52, opening at both sides thereof. This channel serves to facilitate loading, unloading and sealing of the container in a manner similar to that expressed in connection with the previous embodiment.

The top portion of base member 54 is formed with a integral molded-in projecting thread 66 which begins at a point closely adjacent the top edge 60 of the container and is gradually inclined downwardly therefrom.

With particular reference to FIGS. 4 and 6, it can be seen that the cover, generally designated 56, consists of a generally cylindrical body portion 68 which is provided with a thread groove 70 inclined in a manner on the cylindrical body portion complementing the raised thread portion 66 of the base member 54 to permit the threading of the cover 56 to the base member 54. The cover 56 is similarly provided with an end closure 72 which is connected to the cylindrical body portion 68 of the cover to complete the cover structure.

In this embodiment of the container of the invention, the gasket assembly 58 consists of an annular resiliently compressible gasket 74 which, as can be seen in FIG. 6, is designed to rest upon the generally flat horizontal surface 60 of the top edge of the base member 54. As can be seen in both FIGS. 4 and 6, a rigid generally cup-shaped member 76 is positioned within the opening provided by the annular gasket 74. The cup-shaped memmer 76 is provided with an annular generally horizontally extending flange 78 which is designed to rest upon annular gasket 74 when assembled to base 54.

Therefore, when it is desired to seal base member 54 of the container 52 of the invention, the gasket assembly 58 is positioned on the top edge 60 of the base member 54 in a manner such that the resiliently compressible annular gasket 74 rests upon the top edge 60, the cup-shaped portion extends into the mouth of the container and below it, and the flange 78 extends over gasket 74 and is supported thereby.

Cover 56 is rotated to produce the threaded securement of the cover 56 with respect to the base member 54. The threading of the cover on to the base member is continued until the gasket 74 is adequately compressed against the top edge 60 of the base to provide a leak-proof seal of the container and to impart substantial rigidity to the top portion of the otherwise flexible unit.

As is shown in FIG. 5, the cover 56 of this embodiment to the invention is provided with a pair of wedge-shaped recess portions 80 bordered by an enlarged raised portion 82 which configuration is designed to provide a cover grip and to impart additional rigidity in the cover 56 of the container.

I claim:
1. A storage container comprising an elongated generally cylindrical first portion fabricated from a flexible plastic material, the first portion having a closed bottom and an open top, means adjacent the open top of the first portion to provide for the closure of the open top of the first portion, a second generally cylindrical cover portion fabricated from a flexible plastic material, the cover portion having an open bottom and a diameter across the open bottom thereof sufficient to permit the second portion to be telescoped over the first portion in closed relationship therewith, closure means provided on the cover portion cooperable with the closure means of the first portion to provide the closure of the open top of the first portion by the second cover portion, separate gasket assembly means adapted to be disposed between the first and second container portions for providing a seal therebetween to seal the contents of the container therein and to impart reinforcement to the flexible plastic container portions when closed, and gasket assembly retainer means formed on the cover portion and retaining the gasket assembly within the cover prior to, during and subsequent to closure of the container portions, the gasket assembly means retained by the cover portion including a first annular flexible gasket element disposed to effect a contents seal between the first and cover portions, and including a second rigid reinforcing element disposed to reinforce the closed first and cover portions of the container.

2. The storage container of claim 1 wherein an annular channel is formed within the cover portion to receive the outer peripheral portions of the gasket assembly means, the channel having a diameter exceeding that of the inner cylindrical portion of the cover portion of the container.

3. The storage container of claim 2 wherein projection means extend generally radially inwardly of the cover portion adjacent the annular channel thereof to assist in retaining the gasket assembly within the confines of the inner cover portion.

4. The storage container of claim 1 wherein the first annular flexible gasket element of the gasket means comprises an inwardly opening U-shaped member and the second rigid element of the gasket means is a plate member having portions disposed between the legs defining the U-shaped member.

5. The storage container of claim 1 wherein the closure means on the first and second portions of the storage container comprises cooperable screw thread means on the portions.

6. The storage container of claim 1 wherein the cover portion is formed with adjacent raised and depressed portions to impart rigidity to the cover portion and to facilitate the opening and closing of the container.

7. The storage container of claim 1 wherein the closed bottom of the first portion of the container is formed with a channel extending across a portion of the bottom thereof and providing a means for securing the first portion when the second portion is applied thereto or removed therefrom.

8. A storage container comprising an elongated generally cylindrical base portion fabricated from a flexible plastic material, the base portion having a closed bottom connected by a continuous, slightly tapered upstanding side wall, a cylindrical segment extending from a top portion of the side wall terminating in a generally circular open top, securement means disposed adjacent the open top of the base portion to provide for the closure of the generally circular open top of the base portion, a generally cylindrical cover portion fabricated from a flexible plastic material, the cover portion having an open bottom and a cylindrical diameter across the open inner portion thereof sufficient to permit the cover portion to be telescoped over the cylindrical segment of the base portion and in closing relationship therewith, securement means disposed on the cover portion cooperable with the securement means of the base portion to provide the securement of the base and cover portions of the container, a separate gasket assembly means for providing a seal to seal the contents of the container therein and to impart reinforcement to the flexible plastic container portions when in closed relationship, the gasket assembly means being retained within the generally cylindrical cover portion by a gasket assembly retainer means formed on the cover portion to retain the gasket assembly within the cover prior to, during and subsequent to closure of the container portions, the retainer means including an annular channel formed within the cover portion and adjacent the top thereof, the diameter across the annular channel exceeding the diameter across the open inner cylindrical portion thereof, and including a plurality of projections formed on the cover portion adjacent the annular channel and extending radially into the inner cylindrical portion of the cover portion to retain the gasket assembly within the cover portion, the gasket assembly means including a first annular flexible gasket element formed with a U-shaped cross-section supported between the closed cylindrical segment of the base portion and the cover portion and disposed in the channel of the cover portion and including a rigid reinforcing element supported between the legs of the U-shaped annular flexible element and overlying the generally circular open top of the closed base portion.

References Cited

UNITED STATES PATENTS

| | | | |
|---|---|---|---|
| 2,641,374 | 6/1953 | Deryuen | 215—10 |
| 2,691,461 | 10/1954 | Kebbon | 220—46 X |
| 3,214,052 | 10/1965 | Dike | 215—1.5 X |
| 3,298,415 | 1/1967 | Klygis | 150—.5 |

FOREIGN PATENTS

| | | |
|---|---|---|
| 1,309,295 | 10/1962 | France. |
| 1,388,882 | 1/1965 | France. |
| 980,827 | 1/1965 | Great Britain. |

GEORGE E. LOWRANCE, Primary Examiner

U.S. Cl. X.R.

215—1, 40